United States Patent Office 3,438,942
Patented Apr. 15, 1969

3,438,942
CONTINUOUS POLYESTER PROCESS
Hans Scheller, Schonberg, Taunus, Germany, assignor to Vickers-Zimmer Aktiengesellschaft, Planung und Bau von Industrieanlagen
No Drawing. Filed June 1, 1965, Ser. No. 460,499
Int. Cl. C08g *17/01*
U.S. Cl. 260—75                            7 Claims

ABSTRACT OF THE DISCLOSURE

The specification discloses a proces for the production of polyesters and in particular to production of polyethylene terephthalate. Complete transesterification of alkylene glycols with dialkyl terephthalates is conducted in a generally horizontal chambered reactor wherein a plurality of zones are provided by vertical insulated baffle plates. Bis-2-hydroxy-alkyl terephthalate product passes sequentially through the zones, which are maintained at progressively higher temperatures, by means of openings in the lower portions of the baffle plates. During transesterification, alkanol is distilled from the reaction mass and vaporized alkylene glycol is condensed and refluxed to the reactor. The ester product and its pre-polycondensate is then pumped sequentially through three polycondensation reactors in which a temperature is maintained progressively higher and pressure progressively lower, at critical values for the production of a white polyester product. In each successive reactor, a portion of unreacted alkylene glycol is removed from the system.

---

This invention relates to a process for continuous production of polyester and in particular to production of polyethylene terephthalate.

It is well known to produce polyethylene terephthalate by first effecting ester interchange of dimethyl terephthalate and ethylene glycol to make bis-2-hydroxy-ethyl terephthalate in the presence of an ester interchange catalyst and subsequently to polymerize the ester interchange product by condensation polymerization with or without additional catalyst. It is old to effect polymerization by batch processes but heretofore there has been no practical method for continuous polymerization.

It is further known that the total residence time of polycondensation must be carefully controlled in making a product of uniform quality. Accordingly, reaction parameters of pressure, temperature, concentration, intermixing of the polycondensate, etc., must be known in order to effect a continuous process wherein the product is of uniformly high quality. Further, it is known, that for the spinning of the polymer product obtained, especially for the achievement of fine deniers and high strengths, homogeneous polycondensation is necessary to achieve optimum stretch of fibers. This makes necessary carefully controlled reaction conditions during the entire process. It is known, furthermore, that in batch processes for the production of threads and films of polyethylene terephthalate the polyester must be dried under extreme conditions in order that it subsequently be melted for spinning. Such remelting leads to considerable thermal strain on the polycondensate. This drawback is avoided by direct spinning of the product which is contemplated by this invention.

Difficulties in transition from batch to a continuous process lies among other things in the requirement for rapid evolution of glycol vaporizing in the composition to be condensed, so to avoid side reactions. This requires that reactants be subjected to a large surface area for reaction, which enhances glycol evaporation rate.

It has now been found that polyester production may be effected by a continuous process wherein ester interchange product of ethylene glycol and dimethylterephthalate is polymerized in a series of reactors with carefully controlled reaction conditions resulting in a polymer of uniform viscosity suitable for production of fibers and films.

It is thus an object of this invention to provide a process by which polyester, particularly polyethylene terephthalate, may be produced by a continuous process.

Another object of this invention is to provide a continuous polyester process in which resultant polymer viscosity is uniform and in which production costs are lowered by lowering the ratio of dimethylterephthalate to glycol necessary to effect ester interchange.

A further object of this invention is to provide a process whereby, because of uniform viscosity and high quality of polymer product, fibers and films can be made directly from polymer melt thereby eliminating the necessity of first making chips with subsequent working stages of granulation, granulate drying and transport and remelting, thus reducing the thermal damage to polyester which often occurs in drying and remelting granulate.

Briefly, according to this invention, transesterification of ethylene glycol and dimethylterephthalate is conducted in a generally horizontal chambered reactor wherein a plurality of chambers are provided by vertical insulated baffle plates. Bis-2-hydroxy-ethyl terephthalate product passes sequentially through the chambers, which are maintained at progressively higher temperatures, by means of openings in the lower portions of the baffle plates. During transesterification reaction, methanol is distilled from the reaction mass and vaporized ethylene glycol is condensed and refluxed to the reactor.

Ester product is then pumped sequentially through three polycondensation reactors in which temperature is maintained progressively higher and pressure progressively lower. In each reactor, a portion of unreacted vaporous ethylene glycol is removed from the system. The final polymer product according to the invention is of uniform viscosity and is ready for forming into fibers or films.

Ester interchange

As is generally known, three parameters are of the essence in conducting ester interchange of ethylene glycol and dimethyl terephthalate to bis-2-hydroxy-ethyl terephthalate, namely the molar ratio of glycol to dimethyl terephthalate, temperature and reactor residence time. It is desirable that the duration of ester interchange be as short as possible while still attaining a high degree of precondensation. It is also desirable to reduce to a minimum the molar ratio of dimethyl terephthalate and glycol, without adversely affecting the degree of ester interchange and the quality of the ester interchange product. High degree of precondensation is also desired to reduce to a minimum the product loss on entry into the first stage of polycondensation.

The ester interchange reaction of the invention is effected in a plurality of stages, less than 10, preferably 5 to 7, in a chambered reactor in which the reactor temperature is increased from stage to stage in order to drive off accumulating methanol and to accelerate the transesterification reaction. An apparatus suitable for effecting ester interchange of this invention is described in copending application Ser. No. 270,916, filed Apr. 5, 1963, now U.S. Patent 3,245,762.

Generally, the reactor should be horizontally oriented and provided with vertical insulated baffles dividing the reaction chamber into 10 or less sections placed side by side. There must also be provided heating and stirring means in each chamber and means for condensing vaporous ethylene glycol for reflux to the chambers while permitting vaporous methanol to be removed as a gas. There is also provided outlet means by which the level of liquid in the reactor is controllable, e.g. vertically adjustable overflow pipe. By varying liquid level, residence time of reactants in the reactor is controllable.

In the process, ethylene glycol and dimethylterephthalate are pumped into the reactor in ratio between 2.2:1 and 1.5:1, preferably about 1.80:1. Reactor temperature in the first chamber is about 160–180° C., increasing from chamber to chamber to a maximum at the outlet of about 250° C. The preferred temperature range is 180° C. to 230° C. Reactor pressure is substantially atmospheric. Reactant residence time is from 4 to 8 hours, preferably about 5 hours.

In the following table operational and performance data for a 7-stage process are presented, illustrating the continuous ester interchange of the invention. Note that the data of Table I are in three parts, each part showing operation with two parameters constant and the third parameter variable.

TABLE I

| Temperature chambers 1–7 (° C.) | Molar ratio DMT/glycol | Residence time (hours) | Ester-interchange degree (%) | Mean degree of polymerization, n̄ |
|---|---|---|---|---|
| 160–200 | 1:2.2 | 5 | 96–97 | 1.0 |
| 160–210 | 1:2.2 | 5 | 97–99 | 1.1 |
| 160–220 | 1:2.2 | 5 | 100 | 1.5 |
| 160–230 | 1:2.2 | 5 | 100 | 1.6 |
| 160–240 | 1:2.2 | 5 | 100 | 2.0 |
| 160–250 | 1:2.2 | 5 | 100 | 2.0 |
| 160–240 | 1:2.2 | 4 | 100 | 1.7 |
| 160–240 | 1:2.2 | 5 | 100 | 2.0 |
| 160–240 | 1:2.2 | 6 | 100 | 2.0 |
| 160–240 | 1:2.0 | 5 | 100 | 2.0 |
| 160–240 | 1:1.9 | 5 | 100 | 2.0 |
| 160–240 | 1:1.8 | 5 | 100 | 2.0 |
| 160–240 | 1:1.7 | 5 | 100 | 2.0 |
| 160–240 | 1:1.6 | 5 | 100 | 2.0 |
| 169–240 | 1:1.5 | 5 | 90–95 | 2.0 |

From Table I it is apparent that with control of process parameters, optimal conditions can be achieved and the reduction of molar ratios of DMT to glycol of 1:2.2 mol, as is necessary in batch processes, to as low as 1:1.6 is possible resulting in considerable savings in production costs.

Furthermore, because of constant composition of the vapor mixture leaving the reactor, uniform degree of purity is achieved for the methanol liberated in the ester interchange process which is later rectified by distillation.

First polycondensation reactor

From the ester interchange reactor, the transesterification product is continuously fed to a first polycondensation reactor wherein there is effected the first phase of condensation polymerization. A suitable reactor is described in copending application Ser. No. 460,258, filed June 1, 1965.

In general, the reactor comprises a vertical chamber with a heating jacket. External to the chamber is a heat exchanger through which polycondensate is recycled. Stirring means constantly agitate the reacting material in the chamber as it circulates between the chamber and the heat exchanger. Polycondensate product is drawn off at the bottom of the chamber for transporting to the second reactor and ethylene glycol is removed as vapor at the top. Ratio of recycle-to-product draw-off is preferably between 10:1 and 20:1. By varying the recycle ratio, reactor residence time is controlled. Such time may vary from 1 to 4 hours, preferably about 3 hours.

By means of the jacketed chamber and the external heat exchanger, reactants are maintained between about 255 and 270° C. By means of a vacuum pump ethylene glycol continuosly removed from the reactor and reactor pressure is maintained from 20 to 200 torr, preferably 25 to 150 torr (1 torr=1 min Hg=1/760 atm.). The following Table II, like Table I, illustrates in three parts operation of the first polycondensation reactor. In each part two parameters are constant and the third variable.

TABLE II.—REACTOR I

| Temperature (° C.) | Residence time (hours) | Pressure (torr) | Product loss (percent) | Viscosity (ηintr) | Color of the condensate |
|---|---|---|---|---|---|
| 240 | 3 | 50 | 1 | 0.06 | White. |
| 250 | 3 | 50 | 1 | 0.09 | Do. |
| 260 | 3 | 50 | 1 | 0.18 | Do. |
| 270 | 3 | 50 | 1 | 0.20 | Do. |
| 280 | 3 | 50 | 1 | 0.20 | Yellow. |
| 260 | 1 | 50 | 1 | 0.06 | White. |
| 260 | 1.5 | 50 | 1 | 0.07 | Do. |
| 260 | 2 | 50 | 1 | 0.10 | Do. |
| 260 | 2.5 | 50 | 1 | 0.17 | Do. |
| 260 | 3 | 50 | 1 | 0.18 | Do. |
| 260 | 4 | 50 | 1 | 0.18 | Yellowish. |
| 260 | 3 | 400 | 1 | 0.10 | Do. |
| 260 | 3 | 200 | 1 | 0.12 | Do. |
| 260 | 3 | 150 | 1 | 0.18 | Do. |
| 260 | 3 | 100 | 1 | 0.18 | White. |
| 260 | 3 | 80 | 1 | 0.18 | Do. |
| 260 | 3 | 50 | 1 | 0.18 | Do. |
| 260 | 3 | 30 | 3–5 | 0.26 | Do. |
| 260 | 3 | 10 | 10 | 0.29 | Do. |

Second polycondensation reactor

From the first polycondensation reactor, the polycondensate product is pumped to a second polycondensation reactor in which is effected the second phase of polymerization. A suitable reactor is as described in copending application Ser. No. 460,174, filed June 1, 1965.

In general, the reactor is a horizontally oriented cylinder which is compartmented by insulated vertical baffle plates defining reaction zones and through which is axially mounted a rotatable shaft with helical flights or tumble rings for transporting and agitating polymerization product through the reactor. The chambers communicate through openings in the bottom of the baffle plates. The reactor is jacketed along its periphery and the jacket may be divided into a plularity of jackets which are independently controllable to provide for temperature variation along the flow path of polymer product.

The second phase of polymerization reaction is carried out preferably at between 260 and 280° C. and between about 1 to 20 torr, preferably about 3 torr. Vaporous ethylene glycol is removed during reaction. Residence time is 2 to 6 hours, preferably about 3 hours. Table III, similar to Tables I and II, is in four parts showing the effect on the polymer product of varying temperature; reactor residence time, pressure and agitation.

TABLE III.—REACTOR II

| Temperature (° C.) | Residence time (hours) | Pressure (torr) | Agitator (r.p.m.) | Viscosity (ηintr) | Color of the condensate |
|---|---|---|---|---|---|
| 260 | 3 | 5 | 50 | 0.42 | White. |
| 270 | 3 | 5 | 50 | 0.53 | Do. |
| 275 | 3 | 5 | 50 | 0.55 | Do. |
| 280 | 3 | 5 | 50 | 0.58 | Yellow. |
| 270 | 2 | 5 | 50 | 0.34 | White. |
| 270 | 2.5 | 5 | 50 | 0.40 | Do. |
| 270 | 3 | 5 | 50 | 0.53 | Do. |
| 270 | 4 | 5 | 50 | 0.56 | Yellowish. |
| 270 | 5 | 5 | 50 | 0.60 | Yellow. |
| 270 | 6 | 5 | 50 | 0.66 | Yellowish. |
| 270 | 3 | 5 | 20 | 0.30 | White. |
| 270 | 3 | 5 | 30 | 0.36 | Do. |
| 270 | 3 | 5 | 40 | 0.40 | Do. |
| 270 | 3 | 5 | 50 | 0.53 | Do. |
| 270 | 3 | 5 | 60 | 0.63 | Do. |
| 270 | 3 | 10 | 50 | 0.48 | Do. |
| 270 | 3 | 5 | 50 | 0.53 | Do. |
| 270 | 3 | 2 | 50 | 0.58 | Do. |
| 270 | 3 | 0.5 | 50 | 0.59 | Do. |

Third polycondensation reactor

The final condensation takes place in a third reactor by means of a horizontally-arranged chamber provided with a plurality of intermeshing worm screws running in the same direction. A suitable reactor, described in copending application Ser. No. 310,705, filed Sept 23, 1963, now U.S. Patent 3,343,992, not only transports the polymer material through the reactor but also creates by screw threads a large surface area to effect a homogeneous final condensation. The reactor is jacketed along its periphery with independently controllable heating means to provide for increasing reactant temperature from inlet to outlet. The reaction is carried out between 270 and 300° C., preferably about 275° C., and a pressure of about 2 to 0.1 torr, preferably about 0.3 to 0.1 torr. Residence time is 1 to 5 hours, preferably 2 to 3 hours. From the final reactor the product passes directly to the spinning head. Before entering the spinning system pigments, delustering agents such as $TiO_2$ and/or heat and light stabilizers as also brighteners may be admixed with the product.

Table IV illustrates in three parts operation of the third polycondensation reactor. In each part, two parameters are constant and the third variable.

TABLE IV.—REACTOR III

| Temperature (° C.) | Residence time (min.) | Pressure (torr) | Viscosity ($\eta intr$) | Color of the condensate |
|---|---|---|---|---|
| 270 | 1.5 | 0.2 | 0.71 | White. |
| 275 | 1.5 | 0.2 | 0.76 | Do. |
| 280 | 1.5 | 0.2 | 0.80 | Yellowish. |
| 290 | 1.5 | 0.2 | 0.65 | Yellow. |
| 300 | 1.5 | 0.2 | 0.60 | Do. |
| 275 | 0.5 | 0.2 | 0.65 | White. |
| 275 | 1 | 0.2 | 0.71 | Do. |
| 275 | 1.5 | 0.2 | 0.76 | Do. |
| 275 | 2 | 0.2 | 0.76 | Yellowish. |
| 275 | 3 | 0.2 | 0.70 | Yellow. |
| 275 | 1.5 | 2 | 0.62 | Yellowish. |
| 275 | 1.5 | 1.5 | 0.68 | Do. |
| 275 | 1.5 | 1.0 | 0.70 | White. |
| 275 | 1.5 | 0.5 | 0.76 | Do. |
| 275 | 1.5 | 0.2 | 0.76 | Do. |
| 275 | 1.5 | 0.1 | 0.76 | Do. |

As transesterification catalyst, there may be employed any catalyst well-known in the art, e.g. zinc acetate. Although addition of further catalyst in the first polycondensation reactor or in the ester-interchange reactor, preferably in its last chamber, is not essential it may be desirable. Such catalyst may be antimony trioxide, as well as other tin and antimony compounds known in the art.

In a preferred embodiment of the invention, zinc acetate is used as transesterification catalyst in quantity of about 0.056% by weight of dimethylterephthalate. As polycondensation catalyst antimony trioxide is added to the first polycondensation reactor in quantity of about 0.04% by weight of dimethylterephthalate. To inhibit residual zinc acetate there may also be added about 0.1 to 0.15% by weight of alkylphosphite or alkylarylphosphite, preferably trinonylphenylphosphite.

I claim:

1. Process for continuous production of polyethylene terephthalate comprising (a) admixing to effect reaction ethylene glycol and dimethylterephthalate reactants in a mole ratio of between 2.2:1 to 1.5:1 in a reactor in the presence of ester interchange catalyst while distilling methanol from said reactor, to produce as an ester interchange product bis-2-hydroxy-ethyl terephthalate, said reaction being effected at substantially atmospheric pressure in a plurality of horizontally oriented reaction zones in said reactor wherein reactants pass sequentially from a first zone to a final zone while being agitated therein, the reactant level in said reactor being controlled to provide a residence time of from 4 to 8 hours, the temperature of said zones being controlled to increase from said first zone through said final zone in a range of from 160–250° C., and vaporized ethylene glycol is condensed and refluxed to said reactor; thereafter passing said bis-2-hydroxy-ethyl terephthalate sequentially through three polycondensation reactors in which temperature is maintained progressively higher and pressure progressively lower by the steps of: (b) passing said bis-2-hydroxy-ethyl terephthalate to a first polycondensation reactor maintained at about 255 to 270° C. and about 25 to 150 torr, agitating said terephthalate while removing vaporous ethylene glycol from said first reactor, and retaining said terephthalate in said reactor for a residence time of from 1–4 hours, whereby condensation polymerization occurs; (c) passing the product of said first reactor through a series of reaction compartments defined between vertical baffle plates having bottom openings for communication therebetween in a horizontally oriented second reactor, said reactor being heated by a plurality of jackets independently controllable to provide for temperature variation therealong in the range of between about 260 to 280° C. and between about 1 and 20 torr, agitating said product while removing vaporous ethylene glycol from said second reactor, and retaining said product in said reactor for a residence time of from 2–6 hours; and (d) passing the product of said second reactor through a third reactor, said reactor being maintained at a progressively increasing temperature of from about 270° C. to about 280° C. and from about 0.1 to about 1 torr, agitating said product in a large surface area to effect homogeneous final condensation while removing vaporous ethylene glycol from said third reactor, and retaining said product in said reactor for a residence time of from 1–5 hours, thereby producing a condensation product suitable for making fibers and films.

2. Process of claim 1 wherein polycondensation catalyst is added to said first polycondensation reactor.

3. Process of claim 1 wherein polycondensation catalyst is added to said ester interchange reactor.

4. Process of claim 1 wherein the ratio of ethylene glycol to dimethylterephthalate is between about 2.2:1 and 1.6:1.

5. Process of claim 4 wherein said ratio is about 1.80:1.

6. A process as in claim 1 wherein in step (a) the temperature range in said zones is from 180–230° C., the residence time in said reactor is about 5 hours.

7. A process as in claim 1 wherein the residence time of said product in said step (c) is less than about 4 hours and the pressure is between about 1 to 3 torr, and the pressure in step (d) is from 0.1 to 0.3 torr.

References Cited

UNITED STATES PATENTS

| 2,727,882 | 12/1955 | Vodonik | 260—75 |
| 2,973,341 | 2/1961 | Hippe et al. | 260—75 |
| 3,054,776 | 9/1962 | Higgins | 260—75 |
| 3,167,531 | 1/1965 | Parker et al. | 260—75 |
| 3,174,830 | 3/1965 | Watzl et al. | 260—75 |
| 3,261,812 | 7/1966 | Bell et al. | 260—75 |
| 3,271,370 | 9/1966 | Akin | 260—75 |

FOREIGN PATENTS

| 1,372,365 | 8/1964 | France. |
| 1,128,657 | 4/1962 | Germany. |

WILLIAM H. SHORT, *Primary Examiner.*

LOUISE P. QUAST, *Assistant Examiner.*